US009170818B2

(12) United States Patent
Tran (10) Patent No.: US 9,170,818 B2
(45) Date of Patent: Oct. 27, 2015

(54) REGISTER RENAMING SCHEME WITH CHECKPOINT REPAIR IN A PROCESSING DEVICE

(75) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 342 days.

(21) Appl. No.: 13/094,110

(22) Filed: Apr. 26, 2011

(65) Prior Publication Data

US 2012/0278596 A1 Nov. 1, 2012

(51) Int. Cl.
G06F 9/30 (2006.01)
G06F 9/38 (2006.01)

(52) U.S. Cl.
CPC .............. *G06F 9/384* (2013.01); *G06F 9/3838* (2013.01); *G06F 9/3851* (2013.01); *G06F 9/3863* (2013.01)

(58) Field of Classification Search
CPC ...................................... G06F 9/384
USPC ........................................ 712/217
See application file for complete search history.

(56) References Cited

U.S. PATENT DOCUMENTS

| | | | | |
|---|---|---|---|---|
| 5,675,759 | A * | 10/1997 | Shebanow et al. | 712/217 |
| 7,043,626 | B1 * | 5/2006 | McMinn et al. | 712/217 |
| 7,406,587 | B1 * | 7/2008 | Zhang et al. | 712/217 |
| 2003/0135713 | A1 | 7/2003 | Rychlik et al. | |
| 2005/0086452 | A1 * | 4/2005 | Ross | 712/34 |
| 2005/0120191 | A1 | 6/2005 | Akkary et al. | |
| 2007/0005939 | A1 * | 1/2007 | Latorre et al. | 712/217 |
| 2008/0059771 | A1 * | 3/2008 | Svendsen et al. | 712/218 |
| 2008/0077778 | A1 | 3/2008 | Davis et al. | |
| 2008/0148022 | A1 * | 6/2008 | Piry et al. | 712/217 |
| 2010/0153690 | A1 * | 6/2010 | Vick et al. | 712/217 |
| 2012/0265971 | A1 * | 10/2012 | Alexander et al. | 712/225 |

OTHER PUBLICATIONS

Moudgill et al., "Register renaming and dynamic speculation: an alternative approach", Dec. 1993, Proceedingd of the 26th Annual International Symposium on Microarchitecture, p. 202-213.*
Hinton et al., "The Microarchitecture of the Pentium 4 Processor", Q1 2001, Intel Technology Journal, p. 1-13.*
Buti et al., "Organization and implementation of the register-renaming mapper for out-of-order IBM POWER4 processors", Jan 2005, IBM Journal of Research & Development, vol. 49, No. 1, p. 167-188.*
Yeager, "The MIPS R10000 Superscalar Microprocessor", Apr. 1996, Micro, IEEE vol. 16 Issue 2, p. 28-41.*
Leibholz et al., "The Alpha 21264: A 500 MHz Out-of-Order Execution Microprocessor", Feb. 1997, Compcon '97 Proceedings, IEEE, p. 28-36.*
Nancy Warter-Perez, "Register Renaming Through Tomasulo's Algorithm and Remap Tables," Apr. 28, 2005, pp. 1-73.

* cited by examiner

Primary Examiner — Andrew Caldwell
Assistant Examiner — Yuqing Xiao (57) ABSTRACT

A data processing device maintains register map information that maps accesses to architectural registers, as identified by instructions being executed, to physical registers of the data processing device. In response to determining that an instruction, such as a speculatively-executing conditional branch, indicates a checkpoint, the data processing device stores the register map information for subsequent retrieval depending on the resolution of the instruction. In addition, in response to the checkpoint indication the data processing device generates new register map information such that accesses to the architectural registers are mapped to different physical registers. The data processing device maintains a list, referred to as a free register list, of physical registers available to be mapped to an architectural registers.

11 Claims, 7 Drawing Sheets

REGISTER RENAMING SCHEME WITH CHECKPOINT REPAIR IN A PROCESSING DEVICE

FIELD OF THE DISCLOSURE

The present disclosure relates generally to processing devices and more particularly relates to register management at a processing device.

BACKGROUND

Generally, a data processing device operates to execute program instructions to perform various data processing tasks. In order to execute program instructions more efficiently, some data processing devices employ techniques, such as out-of-order execution and speculative execution, that require preservation of processor state data at designated checkpoints. In some data processing devices, the processor state is preserved by copying, at a checkpoint, a device register file to memory. However, this can require an undesirably large amount of memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A data processing device maintains register map information that maps accesses to architectural registers, as identified by instructions being executed, to physical registers of the data processing device. In response to determining that an instruction, such as a speculatively-executing conditional branch, indicates a checkpoint, the data processing device stores the register map information for subsequent retrieval depending on the resolution of the instruction. In addition, in response to the checkpoint indication the data processing device generates new register map information such that accesses to the architectural registers are mapped to different physical registers. The data processing device maintains a list, referred to as a free register list, of physical registers available to be mapped to an architectural register. The data processing device also maintains information, referred to as a scoreboard, indicating whether there are pending accesses to each physical register, so that physical registers without a pending access can be added to the free-list. The free-list and scoreboard are managed so that only the register map information, rather than the contents of the physical registers themselves, are stored in response to a checkpoint. This can reduce the amount of device area and power required to preserve the data processor state at the checkpoint.

Figure 1:
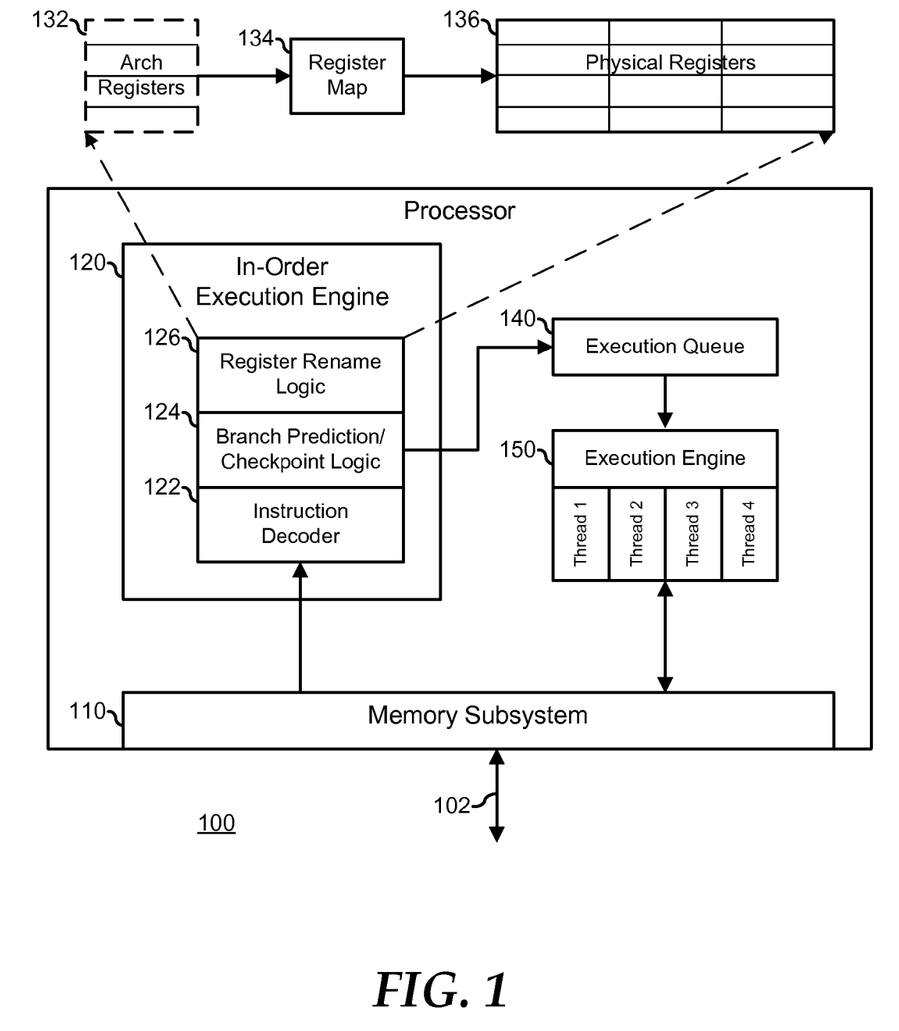
FIG. 1 is a block diagram illustrating a processing device according to an embodiment of the present disclosure.

FIG. 1 illustrates a processing device 100 that includes a memory subsystem 110, an in-order execution engine 120, an execution queue 140, and an out-of-order execution engine 150. Memory subsystem 110 is connected to an external bus 102, and operates to receive requests for program instructions and data from a memory (not illustrated), and retrieve the requested program instructions and data for processing by processing device 100. In-order execution engine 120 includes an instruction decoder 122, a branch prediction/checkpoint logic 124, and a register rename logic 126.

Instruction decoder 122 receives the program instructions from memory subsystem 110, determines the operations specified by the program instructions, determines the identities of the architectural registers 132, as described below, that provide the source data for the specified operations, and determines the identities of the architectural registers that are the destination for the results from the specified operations. Instruction decoder 122 also breaks down the program instructions into microcode operations that, when provided to out-of-order execution engine 150, direct the out-of-order execution engine to perform the various steps needed to carry out the specified operations.

Branch prediction/checkpoint logic 124 determines whether or not the program instructions can be executed in a sequence that differs from their original order, and provides the decoded program instructions and information about the associated physical registers 136, as described below, to execution queue 140. Execution queue 140 receives the decoded program instructions and the information about the associated source data for the specified operations, and queues them into execution engine 150. Execution engine 150 includes several functional units, such as one or more arithmetic logic units, and one or more floating point units, and can process multiple program threads at the same time. When execution engine 150 has completed a particular program instruction, the program instruction is retired from the execution engine, and the resulting data is sent to memory subsystem 110.

Processing device 100 implements an instruction set architecture that specifies an instruction set, data types, addressing modes, memory architecture, interrupt and exception handling, I/O architecture, a set of architectural registers, and other elements related to programming of the processing device. The architectural registers are registers that can be identified by the instruction set for access (such as read and write operations). The microarchitecture of the processing device 100 implements register renaming such that the architectural registers can be mapped to one or more physical registers, In the illustrated embodiment, processing device 100 includes a set of physical registers 136 that are implemented in the microarchitecture, and a set of architectural registers 132 that are specified by the instruction set architecture associated with the processing device, and that are mapped to the physical registers by a register map 134. The program instructions specify one or more of architectural registers 132 that provide the source data for the operations identified by the program instructions. However, the source data resides in the physical registers 136. Register map 134 provides the mapping between architectural registers 132 and physical registers 136. Further, the program instructions specify the architectural registers 132 that provide the destination for the results from the operations, but the destinations are in the physical registers 136 that the architectural registers are mapped to in register map 134.

Register rename logic 126 determines if the decoded program instructions include data dependencies for which register renaming is needed, before out-of-order execution can proceed, as described below. A data dependency occurs when a register that supplies data for a first program instruction is written to in a later program instruction. When a data dependency is detected, register rename logic 126 renames the affected architectural register 132 to a free physical register 136 by placing an identifier for the free physical register in register file 134. Branch prediction/checkpoint logic 124 provides the decoded program instructions and the identifiers to the referenced physical registers 136 to execution queue 140. Then, when the program instruction is executed, execution queue 140 provides the decoded program instruction to execution engine 150, the identifiers are used to point to the referenced physical registers 136 which provide the data to be processed.

Figure 2:
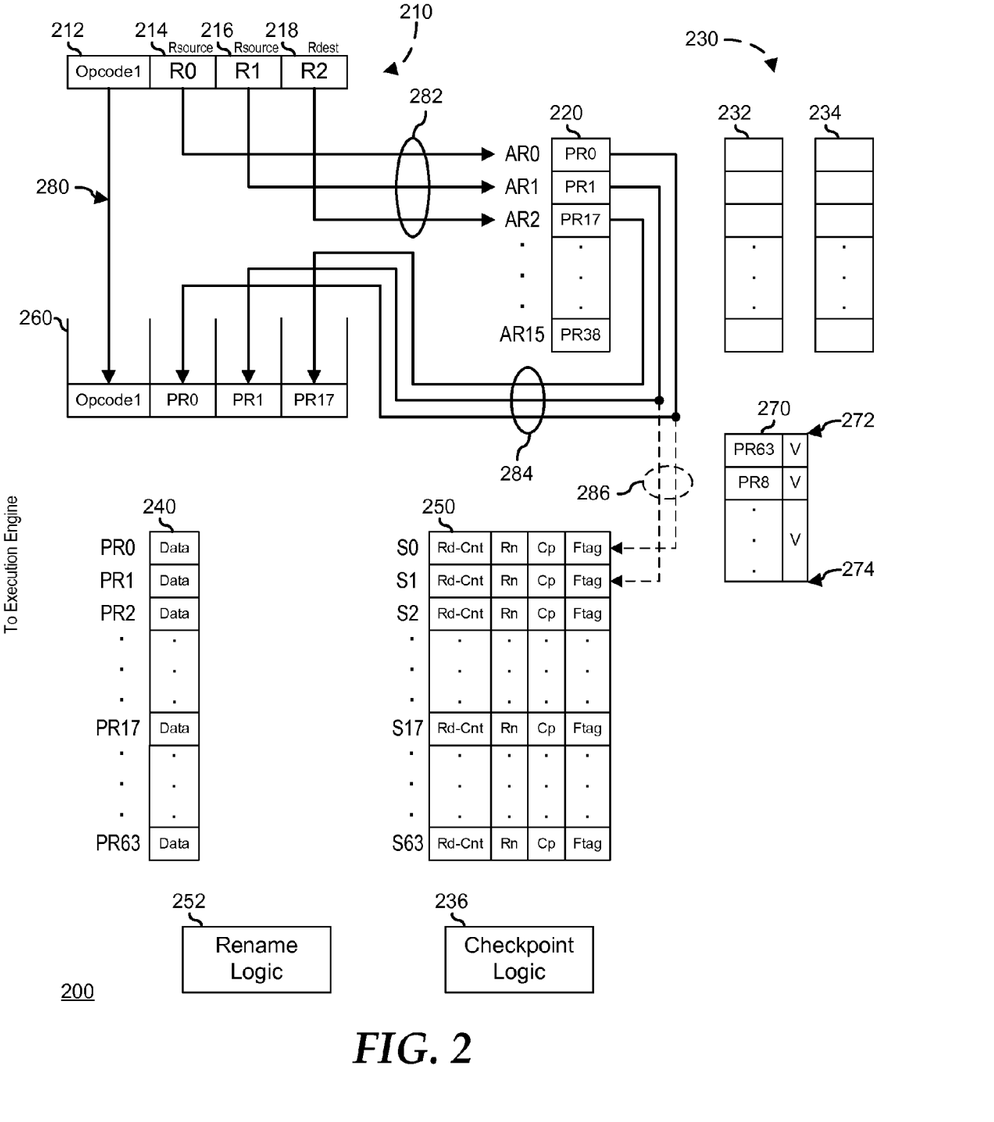
FIGS. 2 and 3 are block diagrams illustrating a register rename logic and a checkpoint logic of the processing device of FIG. 1, according to an embodiment of the present disclosure.

FIG. 2 illustrates a processing device 200, corresponding to processing device 100, according to an embodiment of the present disclosure. Processing device 200 includes a program instruction 210, a register map 220, checkpoint maps 230, checkpoint logic 236, physical registers 240, a scoreboard 250, rename logic 252, an execution queue 260, and a free register list 270. Checkpoint maps 230 include a first checkpoint map 232 and one or more additional checkpoint maps 234. Program instruction 210 includes an opcode field 212 that identifies the operation specified to be performed by the program instruction, a first source register field 214 and a second source register field 216 that identify the architectural registers that provide the source data for the specified operation, and a destination register field 218 identifies the architectural register that provides the destination for the result of specified operation. In a particular embodiment, the architectural register that is identified by destination register field 218 also provides source data for the specified operation, in the place of source register field 216.

An execution flow for placing program instruction 210 into execution queue 260 is also illustrated in FIG. 2, where opcode1 from opcode field 212 is placed into execution queue 260 in step 280. Source register fields 214 and 216, and destination register field 218 each identify one of the architectural registers in the instruction set architecture of processing device 200 that will provide data to be processed by program instruction 210, and the location for the result processing the program instruction. Register map 220 includes one entry for each architectural register specified by the instruction set architecture. Thus, source register fields 214 and 216, and destination register field 218 each indicate in step 282 an associated entry in register map 220. For example, source register field 214 indentifies the source as R0 and points to an entry in register map 220 that is associated with architectural register AR0, source register field 216 indentifies the source as R1 and points to an entry in register map 220 that is associated with architectural register AR1, and destination register field 218 identifies the destination as R2 and points to an entry in the register map that is associated with architectural register AR2. Register map 220 includes an entry for each architectural register, and each entry includes a physical register identifier. In this way, each architectural register is uniquely mapped to one physical register. Thus, for example, AR0 is mapped to PR0, AR1 is mapped to PR1, and AR2 is mapped to PR17. The physical register identifiers associated with the architectural registers referenced in program instruction 210 are placed into execution queue 260 in step 284. Thus, for example, the physical register identifier "PR0" is placed into execution queue 260 as the first source register, the physical register identifier "PR1" is placed as the second source register, and the physical register identifier "PR17" is placed as the destination register.

Scoreboard 250 provides status information for each physical register 240, and includes an associated entry for each physical register. Each entry includes a read counter, a rename indicator, a checkpoint indicator, and a free tag indicator. When opcode1 from program instruction 210 indicates a read to a register, rename logic 252 increments the read counter for the associated physical register 240 in step 286. Thus, for example, when the physical register identifiers "PR0" and "PR1" are provided as source registers to execution queue 260 in step 284, the read counters in the associated scoreboard entries S0 and S1 are incremented.

When an architectural register 220 is first secured by a program instruction, the associated entry in scoreboard 250 has its read counter incremented. Subsequent program instructions can provide for additional reads to the same physical registers 240, resulting in the associated read counter being incremented further. If the same architectural register 220 is a destination of a subsequent program instruction, then the associated entry in scoreboard 250 has its rename indicator set. As these pending reads of the data in these physical registers 240 are sent to the execution engine, the read counter is decremented, and, when the last pending read is sent to the execution engine, the read counter will be decremented to zero. When the read counter associated with a particular physical register 240 is equal to zero, then there are no outstanding reads to that physical register, and that physical register is in a free state. When a physical register 240 is in the free state, the renamed indicator in the associated scoreboard 250 entry is cleared, and an identifier for the free physical register is placed in free register list 270. In a particular embodiment, free register list 270 operates as a stack, including a top-of-stack pointer 272 and a bottom-of-stack pointer 274. As used herein, the top of the stack refers to the location where the next stack entry placed on the stack will be stored. As used herein, the bottom of the stack refers to the location furthest from the top of the stack, such that if all entries from the stack were removed in stack order beginning at the top of the stack, the entry at the bottom of the stack would be the last one removed.

Figure 3:
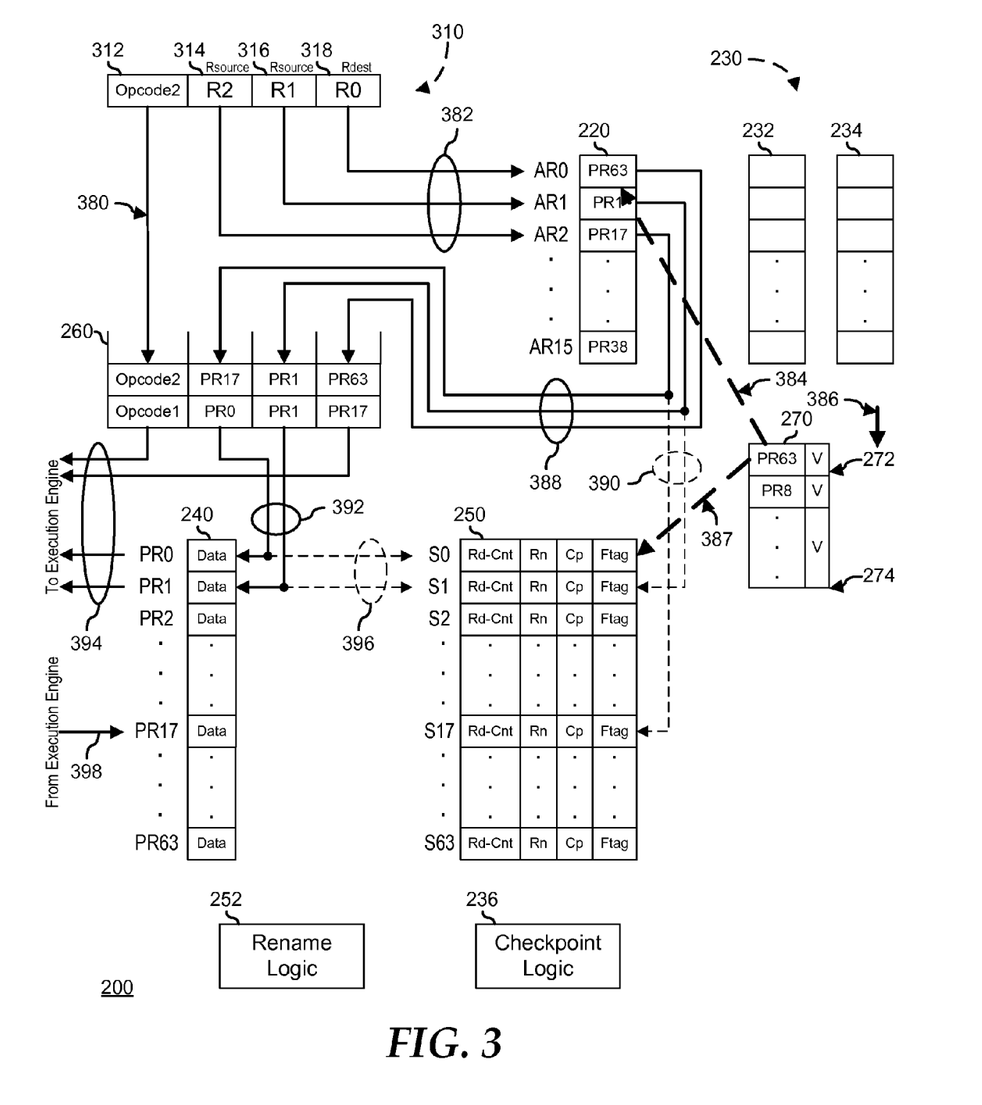

FIG. 3 illustrates processing device 200 and an execution flow for placing program instruction 310 into execution queue 260, and for providing program instruction 310 to the execution engine, according to an embodiment of the present disclosure. Program instruction 310 is similar to program instruction 210 and includes an opcode field 312, a first source register field 314 and a second source register field 316, and a destination register field 318. Opcode field 312 is placed into execution queue 260 in step 380. Source register fields 314 and 316, and destination register field 318 each indicate in step 382 an associated entry in register map 220. Here, source register field 314 identifies the source as R2 and points to the entry in register map 220 that is associated with architectural register AR2, source register field 316 identifies the source as R1 and points to the entry that is associated with architectural register AR1, and destination register field 318 identifies the destination as R0 and points to the entry that is associated with architectural register AR0.

R0 is the architectural register information in source register field 214 in program instruction 210, and is also the architectural register information in destination register field 318 in program instruction 310. Thus the architectural register R0 is the subject of a write operation subsequent to a read operation (WAR), and so the architectural register R0 must be mapped in register map 220 to a different physical register 240 in order to execute program instruction 310. Here, rename logic 252 examines free register list 270 and determines that PR 63 is free. Rename logic 252 replaces the mapping of AR0 in register map 220 from a mapping to PR0 to a mapping to PR63 in step 384. Rename logic 252 also moves top-of-stack pointer 272 in step 386. Since AR0 is renamed from PR0 to PR63, the rename indicator in scoreboard 250 for S0 is set in step 387. The physical register identifiers associated with the architectural registers referenced in program instruction 310 are placed into execution queue 260 in step 388. Thus, for example, the physical register identifier "PR17" is placed into execution queue 260 as the first source register, the physical register identifier "PR1" is placed as the second source register, and the physical register identifier "PR63" is placed as the destination register. Rename logic 252 increments the read counters for the physical registers 240 that are read (i.e., are source registers) in program instruction 310 in step 390. Thus, for example, when the physical register identifiers "PR1" and "PR17" are provided as source registers to execution queue 260 in step 388, the read counters in the associated scoreboard entries S1 and S17 are incremented.

When program instruction 210 is to be executed, execution queue 260 selects the physical registers for the source data based upon the physical register identifiers in the source register fields (i.e., PR0 and PR1) in step 392, in order to select the data contained in the associated physical registers 240. Then, in step 394, opcode 1, the physical register identifier in the destination register field (i.e., PR17), the data from PR0, and the data from PR1 are provided to the execution engine. Also, rename logic 252 decrements the associated read counters S0 and S1 in step 396. Here, when the read counter for S0 in scoreboard 250 is decremented to zero (i.e., all outstanding reads have been executed) and the rename indicator for S0 is set, then PR0 is determined to be free. Thus, in a step (not illustrated), the rename indicator for S0 is reset, and the physical register identifier PR0 is sent to free register list 270 in the next execution cycle. The result of the operation specified by program instruction 210 is written to the specified destination register (i.e., PR17) in step 398. When program instruction 310 is to be executed, execution queue 260 selects the physical registers for the source data based upon the physical register identifiers in the source register fields (i.e., PR1 and PR17) in a step (not illustrated) similar to step 392, in order to select the data contained in the associated physical registers 240. Then, opcode 2, the physical register identifier in the destination register field (i.e., PR63), the data from PR1, and the data from PR17 are provided to the execution engine in a step (not illustrated) similar to step 394. Also, rename logic 252 decrements the associated read counters S1 and S17 in a step (not illustrated) similar to step 396. The result of the operation specified by program instruction 310 is written to the specified destination register (i.e., PR63) in a step (not illustrated) similar to step 398. In another embodiment (not illustrated), a write-after-write dependency can be handled, such that the first write results in incrementing the associated read counter in scoreboard 250, and the second write is to a renamed physical register 240.

Figure 4:
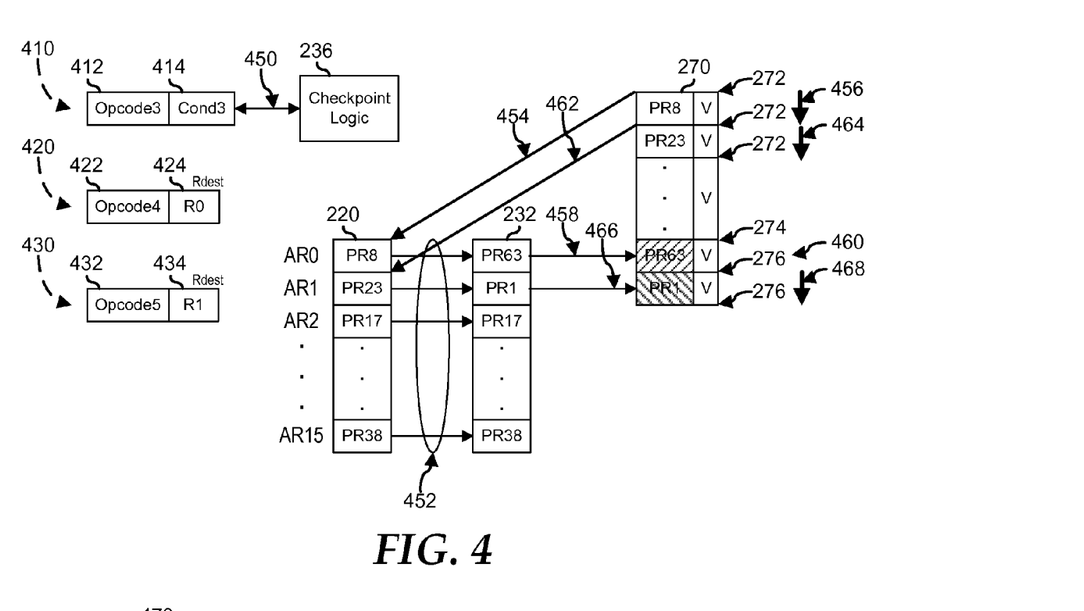
FIG. 4 is a block diagram further illustrating the register rename logic and the checkpoint logic of FIG. 2, showing an execution flow of a branch program instruction according to an embodiment of the present disclosure.

FIG. 4 illustrates register map 220, checkpoint map 232, checkpoint logic 236, free register list 270 of processing device 200, a branch instruction 410, and program instructions 420 and 430, according to an embodiment of the present disclosure. Branch instruction 410 includes an opcode field 412 and a condition field 414. Branch instruction 410 results in the flow of program instructions taking one of two different paths based upon the occurrence of, or non-occurrence of the condition. As used herein, an execution path refers to a group of program instructions selected to be executed as a result of a branch instruction. Processing device 200 includes a branch predictor (not illustrated), similar to branch predictor 124 that makes a speculative prediction as to which branch a branch instruction is likely to take, and fetches code for the predicted branch. Examples of branch instructions and branch predictors in processing devices are well known in the art, and will not be further elaborated on herein, except as follows.

Each of checkpoint maps 232 and 234 include one entry for each architectural register specified by the instruction set architecture, and operates to receive the architectural register map entries from register map 220, or to provide the entries included therein back to the register map. An execution flow of branch instruction 410 is also illustrated in FIG. 4, where checkpoint logic 236 determines that branch instruction 410 is a branch instruction in step 450, and writes the architectural register map entries from register map 220 to checkpoint map 232 in step 452.

As speculative program execution proceeds (i.e., execution of program instructions before it is determined whether or not the branch was correctly predicted, or was mis-predicted), any program instruction that includes a register destination will be renamed. Program instructions 420 and 430 each include an opcode field, 422 and 432, respectively, and a destination register field, 424 and 434, respectively. Thus, because destination register field 424 includes "R0" as the destination architectural register, rename logic 252 examines free register list 270 and determines that PR8 is free. Rename logic 252 replaces the mapping of AR0 in register map 220 from a mapping to PR63 to a mapping to PR8 in step 454. Rename logic 252 also moves top-of-stack pointer 272 in step 456. Then rename logic 252 places the renamed register (i.e., PR63) at the bottom of the stack of free register list 270 in step 458, and places, in step 460, a bottom-of-first-checkpoint-map 276 indicator. This entry is potentially free, as indicated by the cross-hatch pattern on the entry. That is, if the branch that was predicted by the branch predictor is determined to have been correctly predicted, then the state of the processing device as identified by register map 220 is valid, and the saved entries do not need to be retained. Similarly, since destination register field 434 includes "R1" as the destination architectural register, rename logic 252 examines free register list 270 and determines that PR23 is free. Rename logic 252 replaces the mapping of AR1 in register map 220 from a mapping to PR1 to a mapping to PR23 in step 462. Rename logic 252 again moves top-of-stack pointer 272 in step 464. Then rename logic 252 places the renamed register (i.e., PR1) at the bottom of the stack of free register list 270 in step 466, and moves bottom-of-first-checkpoint-map 276 in step 460. This entry is also potentially free, as indicated by the cross-hatch pattern on the entry.

Figure 5:
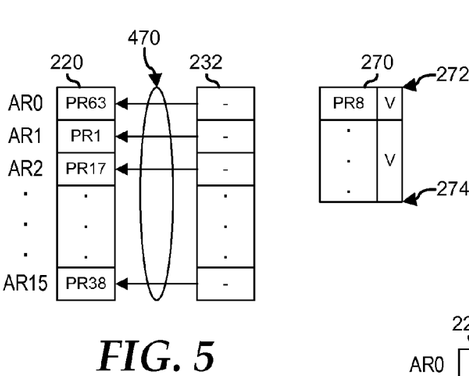
FIG. 5 is a block diagram illustrating the result of a misprediction of the branch program instruction of FIG. 4.

FIG. 5 illustrates the result when the speculative prediction made by the branch predictor for branch instruction 410 was incorrect (i.e., a mis-predicted branch). In the illustrated example, checkpoint logic 236 writes the architectural register map entries from checkpoint map 232 to register map 220 in step 470. Also, top-of-stack pointer 272 and bottom-of-stack pointer 274 are restored to the checkpoint state. In this way, processing device 200 is returned to its state prior to branch instruction 410.

Figure 6:
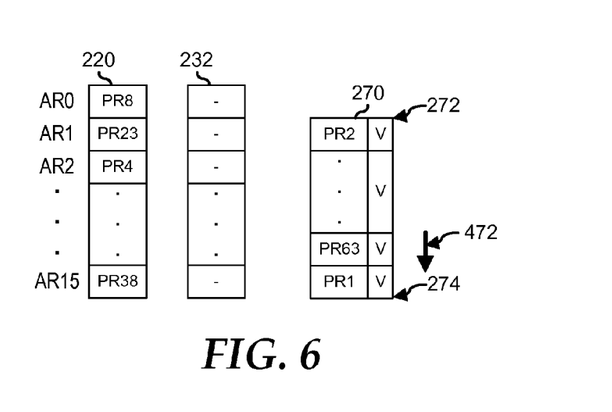
FIG. 6 is a block diagram illustrating the result of a correct prediction of the branch program instruction of FIG. 4.

FIG. 6 illustrates the result when the speculative prediction made by the branch predictor for branch instruction 410 was correct. In the illustrated example, checkpoint logic 236 invalidates checkpoint map 232, thereby freeing checkpoint map 232 for use with another branch instruction. Also, bottom-of-stack pointer 274 is moved to the location of bottom-of-first-checkpoint-map 276, indicating that the potentially free registers are now free.

However, a physical register that is placed on the bottom of free register list 270 by checkpoint logic 236 can still have pending reads queued into execution queue 260, and that have not been provided to the execution engine (i.e., the read counter in scoreboard 250 that is associated with the physical register is not equal to zero). In this case, while such a register is included in free register list 270, renaming operations that included that register would result in data errors in processing device 200. Accordingly, free register list 270 includes a valid bit that is set for each register for which the associated read counter is equal to zero, and that is cleared for each register for which the associated read counter is non-zero. When checkpoint logic 236 places a renamed register at the bottom of the stack of free register list 270, the checkpoint logic also clears the valid bit in the free register list (because the associated program instruction has not yet been executed), sets the associated checkpoint flag in scoreboard 250, and enters a location identifier for the entry in the free register list into the associated free tag indicator in the scoreboard. In a particular embodiment, the location identifier is associated with the depth within the stack of free register list 270, where the potentially free register is located. Then, in the operation of scoreboard 250, as described above, when the read counter for a particular physical register is decremented to zero, the checkpoint flag is checked. If the checkpoint flag is set, the free tag indicator is accessed to locate the associated entry in free register list 270, and checkpoint logic 236 sets the valid bit for the entry in the location indicated by the free tag indicator.

Figure 7:
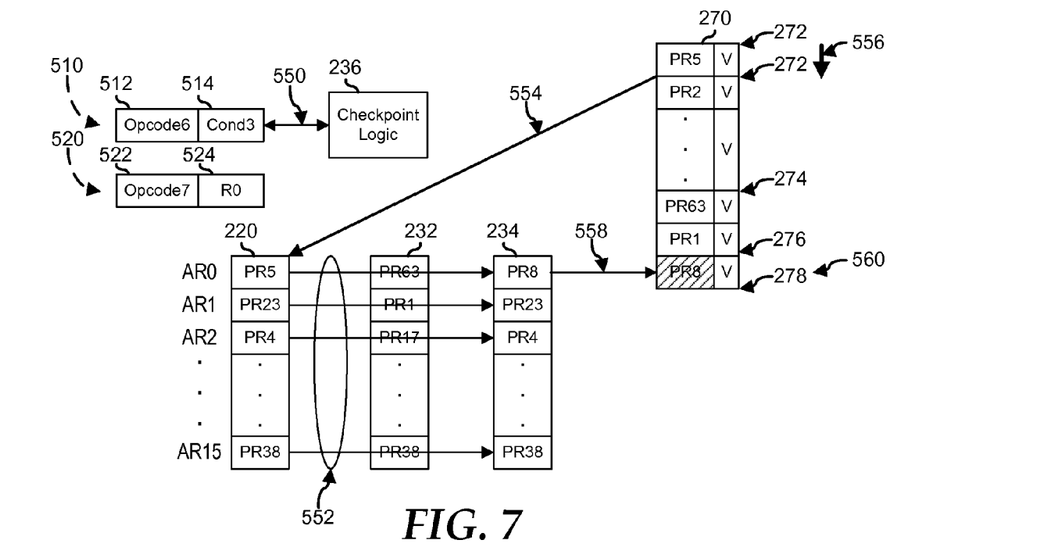
FIG. 7 is a block diagram further illustrating the register rename logic and the checkpoint logic of FIG. 2, showing an execution flow of another branch program instruction according to an embodiment of the present disclosure.

FIG. 7 illustrates register map 220, checkpoint maps 232 and 234, checkpoint logic 236, free register list 270 of processing device 200, a branch instruction 510, and a program instruction 520, according to an embodiment of the present disclosure. In this figure, it is undetermined whether or not the branch predictor correctly predicted the path for branch instruction 410, before branch instruction 510 is to be executed. Here, checkpoint logic 236 determines that branch instruction 510 is a branch instruction in step 550, and writes the architectural register map entries from register map 220 to checkpoint map 234 in step 552.

Program instruction 520 includes an opcode field 522 and a destination register field 524. Because destination register field 524 includes "R0" as the destination architectural register, rename logic 252 examines free register list 270 and determines that PR5 is free. Rename logic 252 replaces the mapping of AR0 in register map 220 from a mapping to PR8 to a mapping to PR5 in step 554. Rename logic 252 also moves top-of-stack pointer 272 in step 556. Then rename logic 252 places the renamed register (i.e., PR8) at the bottom of the stack of free register list 270 in step 558, and places, in step 560, a bottom-of-second-checkpoint-map 278 indicator. This entry is potentially free, as indicated by the cross-hatch pattern on the entry.

Figure 8:
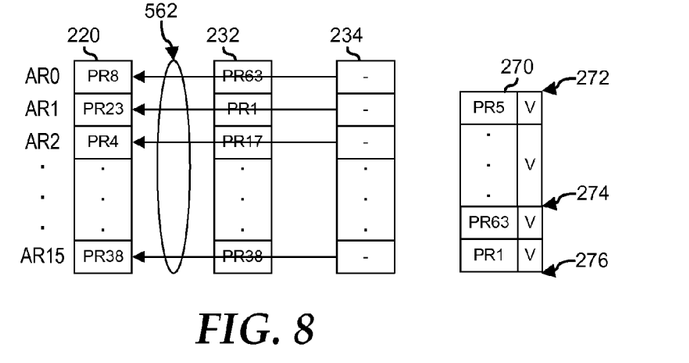
FIG. 8 is a block diagram illustrating the result of a misprediction of the branch program instruction of FIG. 7.

FIG. 8 illustrates the result when the speculative prediction made by the branch predictor for branch instruction 510 was incorrect. Here, checkpoint logic 236 writes the architectural register map entries from checkpoint map 234 to register map 220 in step 562. Also, top-of-stack pointer 272 and bottom-of-first-checkpoint-map 276 are restored to the checkpoint state. In this way, processing device 200 is returned to its state prior to branch instruction 510.

Figure 9:
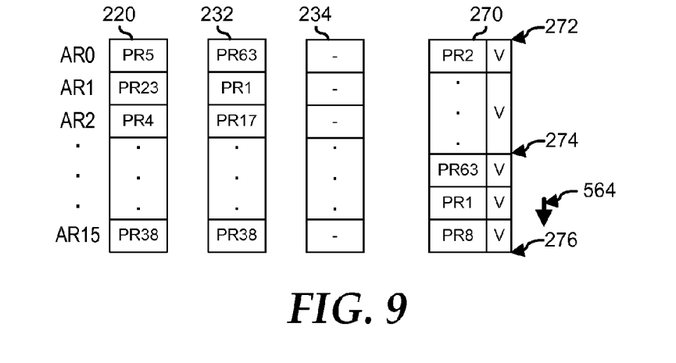
FIG. 9 is a block diagram illustrating the result of a correct prediction of the branch program instruction of FIG. 7.

FIG. 9 illustrates the result when the speculative prediction made by the branch predictor for branch instruction 510 was correct. Here, checkpoint logic 236 invalidates checkpoint map 234, thereby freeing checkpoint map 234 for use with another branch instruction. Also, bottom-of-first-checkpoint-map 276 is moved to the location of bottom-of-second-checkpoint-map 278.

Note that the checkpoint operations of processing device 200 have been described above in the context of branch instructions, but the checkpoint operations are not necessarily limited to only branch instructions, and can also be used for other types of program instructions and procedures. For example, the checkpoint operation can be used to store the state of processing device 200 prior to long latency procedures such as reads from external memory, I/O procedures, error handling procedures, or other program instructions or procedure where conditions make it desirable to store the state of the processing device.

Figure 10:
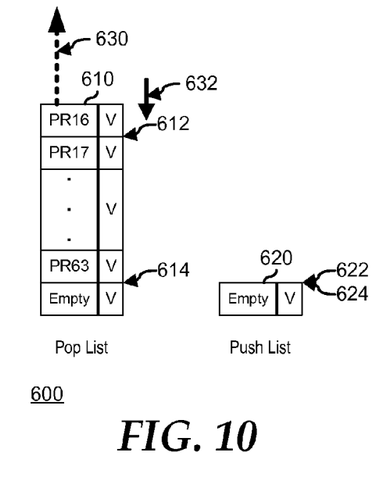
FIGS. 10-13 are block diagrams illustrating another embodiment of the free register list of FIG. 4.

FIGS. 10-13 illustrate another embodiment of a free register list 600 that includes a first free register list 610 and a second free register list 620. As shown in FIG. 10, free register list 610 is a pop list, and free register list 620 is a push list. Free register list 610 includes identifiers for the free physical register, a top-of-stack pointer 612 and a bottom-of-stack pointer 614. Free register list 620 is initially empty and includes a top-of-stack pointer 622 and a bottom-of-stack pointer 624. Because free register list 620 is empty, top-of-stack pointer 622 and bottom-of-stack pointer 624 initially point to the same location. When a register needs to be renamed, a rename logic similar to rename logic 252 examines free register list 610, because it is the pop list, and determines that PR16 is free. The rename logic then maps PR16 to the appropriate architectural register in step 630, and moves top-of-stack pointer 612 in step 632.

Figure 11:
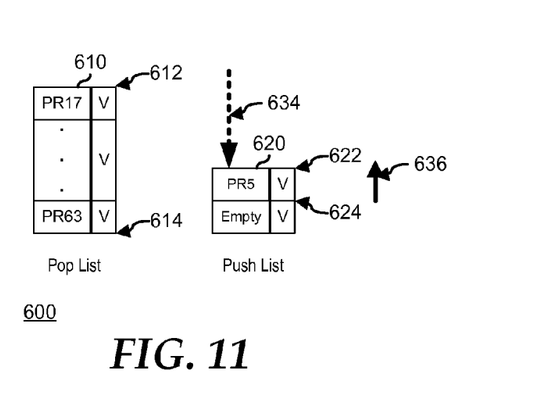
Figure 12:
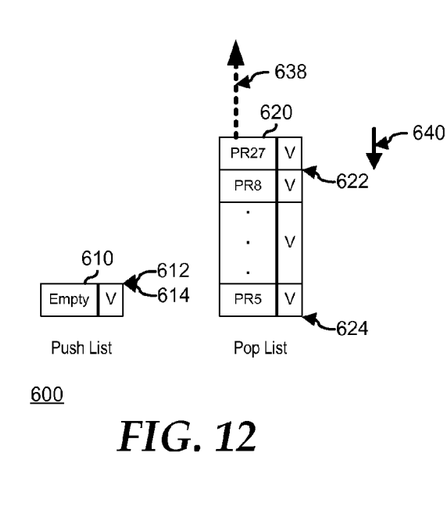
Figure 13:
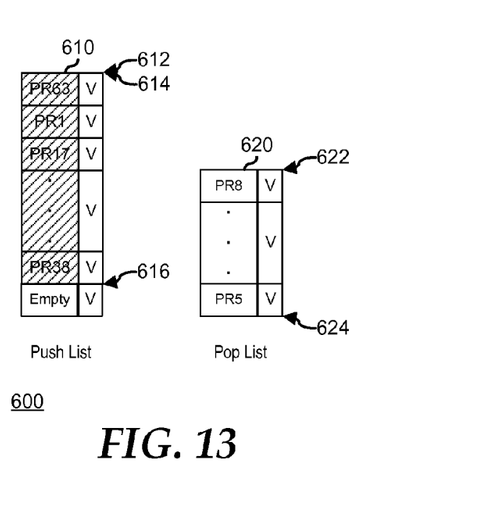

FIG. 11 illustrates the handling of free physical registers. When a physical register becomes free, the rename logic clears a rename indicator in an associated scoreboard similar to scoreboard 250, pushes, in step 634, the free register onto free register list 620, because it is the push list, and moves top-of-stack pointer 622 to show the new location of the top of the stack in step 636. FIG. 12 illustrates switching functions such that free register list 610 becomes the push list and free register list 620 becomes the pop list. Here, when the last free register is popped from free register list 610, free register list 610 becomes the push list, and free register list 620 becomes the pop list. Then, when a register needs to be renamed, the rename logic uses free register list 620 to provide free registers, as shown if steps 638 and 640, and uses free register list 610 to push free registers onto. FIG. 13 illustrates that potentially free physical registers, indicated by the cross-hatch pattern, are written by a checkpoint logic similar to checkpoint logic 236 to the bottom of the push list, free register list 610, with a bottom-of-first-checkpoint-map 616.

Figure 14:
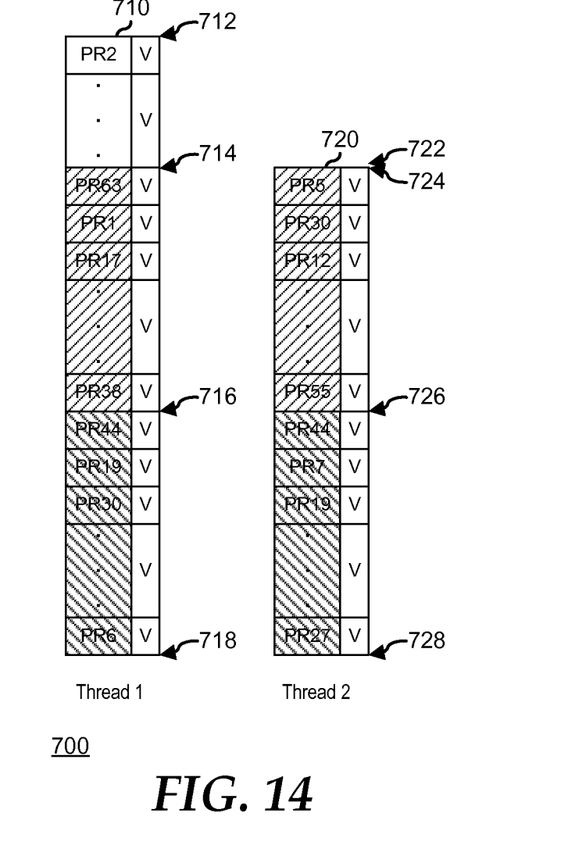
FIG. 14 is a block diagram illustrating yet another embodiment of the free register list of FIG. 4.

FIG. 14 illustrates another embodiment of a free register list 700 that includes a first free register list 710 and a second free register list 720. Here, free register list 710 operates as the free register list for a first processing thread, and free register list 720 operates as the free register list for a second processing thread. Free register list 710 includes a top-of-stack pointer 712, a bottom-of-stack pointer 714, a first-thread bottom-of-first-checkpoint-map pointer 716, and a first-thread bottom-of-second-checkpoint-map pointer 718. Free register list 720 includes a top-of-stack pointer 722, a bottom-of-stack pointer 724, a second-thread bottom-of-first-checkpoint-map pointer 726, and a second-thread bottom-of-second-checkpoint-map pointer 728. Free register lists 710 and 720 operate as pop and push stacks in the same manner as free register lists 610 and 620. The free registers are shared between the two threads. When free register list 710 becomes empty, it becomes the push stack, and free register list 720 becomes the pop stack. However, for checkpoint operations, the potentially free registers associated with a branch instruction are tracked as to which thread generated the branch instruction, and the potentially free physical registers are placed in the free register list 710 or 720 according to which thread included the branch instruction.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to program instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute program instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A processing device comprising:
   a plurality of physical registers;
   a register map comprising a first map entry that is associated with a first architectural register, the first map entry being adapted to store a first identifier of a first physical register of the plurality of physical registers such that a program instruction that accesses the first architectural register results in an access of the first physical register;
   a first free register list comprising a first free register entry adapted to store a second identifier for a second physical register of the plurality of physical registers, wherein the second physical register is not mapped to the first architectural register, and wherein the first free register entry includes a valid entry indicator;
   a first checkpoint map comprising a first checkpoint entry that is associated with the first map entry, wherein the first checkpoint entry is adapted to store the first identifier in response to a first program instruction;
   a scoreboard comprising a first scoreboard entry that is associated with the first physical register, wherein the first scoreboard entry includes a read counter that indicates a number of outstanding reads to the first physical register, a checkpoint indicator that indicates when the first identifier is stored in the first checkpoint entry, and a free tag indicator to store a location identifier for locating an identifier of a physical register in the first free register list;
   checkpoint logic adapted to:
      determine that the first program instruction results in a first change in execution path of program instructions within the processing device; and
      in response to determining that the first program instruction specifies the first change in execution path, to:
         store the first identifier in the first checkpoint entry;
         set the checkpoint indicator;
         store the first identifier at a first location in the first register list in response to storing the first identifier in the checkpoint map;
         clear the valid entry indicator at the first location in response to storing the first identifier in the first free register list;
         store a first location identifier associated with the first location in the free tag indicator; and
         when the read counter indicates that the number of outstanding reads to the first physical register is equal to zero:
            determine if the checkpoint indicator is set;
            access the free tag indicator to determine the first location; and
            set the valid entry indicator at the first location; and
   a renaming logic adapted to:
      determine that a second program instruction that specifies a read operation to the first architectural register is programmed to be executed before a third program instruction that specifies a write operation to the first architectural register, and that the second program instruction is pending execution by an out-of-order execution engine of the processing device after the third program instruction is executed by the execution engine; and in response to determining that the second program instruction will be executed after the third program instruction store the second identifier in the first map entry such that a program instruction that accesses the first architectural register is mapped to the second physical register.

2. The processing device of claim 1, further comprising:

a second checkpoint map comprising a second checkpoint entry that is associated with the first map entry, wherein the second checkpoint entry stores the first identifier in response to a second program instruction;

wherein the checkpoint logic is further adapted to:
determine that the second program instruction specifies a second change in execution path of instructions within the processing device; and
store the first identifier in the second checkpoint entry in response to determining that a second program instruction specifies the second change in execution path.

3. The processing device of claim 1, wherein:

the first free register list is a stack, and the second identifier is initially stored on a top of the stack;

the second and third program instructions are programmed to be executed after the first program instruction;

the checkpoint logic is further adapted to:
store the first identifier in the first free register list below a first bottom of stack pointer for the first free register list;
move a bottom-of-first-checkpoint for the first free register list to below the location of the first identifier; and
enter a location identifier for the location of the first identifier in the first free register into the free tag indicator.

4. The processing device of claim 3, wherein the checkpoint logic is further adapted to:

determine that a plurality of instructions that are associated with the first change in execution path have been executed; and
move the first bottom of stack pointer to below the location of the first identifier in response to determining that the plurality of instructions have been executed.

5. The processing device of claim 1, further comprising:

a second free register list adapted to store a third identifier for a third physical register of the plurality of physical registers, wherein the third physical register is not mapped to the first architectural register;

wherein the processing device is adapted to process a first thread and a second thread;

the first free register list and the second free register list are stacks; and the checkpoint logic is further adapted to:
store a fourth identifier associated with the first thread in the first free register list below a first bottom of stack pointer; and
store a fifth identifier associated with the second thread in the second free register list below a second bottom of stack for the second free register list.

6. The processing device of claim 1, further comprising:

a second architectural register associated with the instruction set architecture;

wherein:
the register map further comprises a second map entry that is associated with the second architectural register, the second map entry being adapted to store a third identifier of a third physical register of the plurality of physical registers such that a program instruction call to the second architectural register is mapped to the third physical register;

the first checkpoint map further comprises a second checkpoint entry that is associated with the second map entry, the second checkpoint entry being adapted to store the third identifier;

the scoreboard further comprises a second scoreboard entry that is associated with the third physical register.

7. A processing device comprising:

a first physical register identified by a first physical register identifier;

a register map including a first register storage location that is associated with a first architectural register, the first register storage location being adapted to store the first physical register identifier such that a program instruction that accesses the first architectural register results in an access of the first physical register;

a first checkpoint map comprising a first checkpoint storage location that is associated with the first register storage location, the first checkpoint storage location being adapted to store the first physical register identifier in response to a first program instruction;

a first free register list including a first free register storage location having a first free register identifier field and a first valid entry field;

a scoreboard including a first scoreboard storage location associated with the first physical register, the first scoreboard storage location having a first read counter field that indicates a number of outstanding reads to the first physical register, a first checkpoint field that indicates when the first physical register identifier is stored in the first checkpoint storage location, and a free tag field that indicates a location in the first free register list; and checkpoint logic adapted to:
store the first physical register identifier in the first checkpoint storage location in response to determining that the first program instruction specifies a change in an execution path of instructions; and
in response to storing the first physical register identifier in the first free register identifier field:
set the checkpoint field;
store the first physical register identifier in the first free register identifier field;
clear the first valid entry field;
store a first free register storage location indicator associated with the first free register storage location in the free tag field; and
when the first read counter indicates that the number of outstanding reads to the first physical register is equal to zero, to:
determine if the checkpoint field is set;
access the free tag field to determine the first free register storage location indicator; and
set the first valid entry field.

8. The processing device of claim 7, wherein the checkpoint logic is further adapted to:

increment the first read counter field in response to receiving, by the processing device, a second program instruction, wherein the second program instruction includes a read addressed to the first physical register.

9. The processing device of claim 8, wherein the checkpoint logic is further adapted to:
   decrement the first read counter field in response to executing, by the processing device, the second program instruction.

10. The processing device of claim 7, wherein the first free register storage location indicator comprises a depth within the first free list that the first physical register identifier is located.

11. A processing device comprising:
   a physical register to store information to be accessed by the processing device, wherein the physical register is identified by a physical register identifier;
   a scoreboard comprising a scoreboard entry associated with the physical register, the scoreboard entry having a read counter field adapted to store a read count that indicates a number of outstanding read accesses to the physical register, a checkpoint indicator that indicates when the physical register identifier is stored in a checkpoint, and a free tag indicator;
   a free register list comprising a free register entry having a free register location field and a valid entry indicator, wherein the free tag indicator stores a location identifier for locating a physical register identifier in the free register list; and
   a checkpoint map comprising a checkpoint entry;
   checkpoint logic adapted:
      to store the physical register identifier in the checkpoint entry in response to determining that an instruction received by the processing device specifies a change in an execution path of instructions; and
      in response to storing the physical register identifier in the checkpoint entry:
         to set the checkpoint indicator;
         to clear the valid entry indicator;
         to store the physical register identifier in the free register location field;
         to enter a location identifier for the free register entry into the free tag indicator; and
         when the read count indicates that the number of outstanding accesses to the physical register is equal to zero:
            to determine if the checkpoint indicator is set;
            to access the free tag indicator to determine location identifier; and
            set the valid entry indicator at the free register entry.

* * * * *